United States Patent
Semenov et al.

(10) Patent No.: US 9,628,709 B2
(45) Date of Patent: *Apr. 18, 2017

(54) SYSTEMS AND METHODS FOR CAPTURING IMAGES USING A MOBILE DEVICE

(71) Applicant: A2iA S.A., Paris (FR)

(72) Inventors: Andrey V. Semenov, St. Petersburg (RU); Valery Anisimov, St. Petersburg (RU); Sergey N. Sashov, St. Petersburg (RU); Nikolai D. Gorski, St. Petersburg (RU)

(73) Assignee: A2iA S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,491

(22) Filed: Oct. 13, 2015

(65) Prior Publication Data

US 2016/0212342 A1 Jul. 21, 2016

Related U.S. Application Data

(63) Continuation of application No. 14/601,437, filed on Jan. 21, 2015, now Pat. No. 9,160,946.

(51) Int. Cl.
G06K 9/00 (2006.01)
G06K 9/32 (2006.01)
(Continued)

(52) U.S. Cl.
CPC ....... *H04N 5/23245* (2013.01); *G06K 9/4604* (2013.01); *G06K 9/4652* (2013.01);
(Continued)

(58) Field of Classification Search
None
See application file for complete search history.

(56) References Cited

U.S. PATENT DOCUMENTS 5,537,483 A 7/1996 Stapleton et al.
6,035,064 A 3/2000 Nakao et al.
(Continued)

OTHER PUBLICATIONS

Stefan Knerr, Valery Anisimov, Olivier Baret, Nikolai Gorski, David Price, Jean-Claude Simon: "The A2iA Intercheque System: Courtesy Amount and Legal Amount Recognition for French Checks," IJPRAI 11(4), 505-548 (1997).
(Continued)

*Primary Examiner* — Randolph I Chu
(74) *Attorney, Agent, or Firm* — Carter, DeLuca, Farrell & Schmidt, LLP

(57) ABSTRACT

The systems and methods of the present disclosure enable a user to use a mobile device to automatically capture a high resolution image of a rectangular object. The methods include capturing a low resolution image of the rectangular object and detecting edges of the rectangular object in the low resolution image, where the edges form a quadrangle, calculating a coordinate of each corner of the quadrangle, calculating an average coordinate of each corner of the quadrangle in a most recent predetermined number of low resolution images, calculating a dispersion of each corner of the quadrangle in the most recent predetermined number of low resolution images from a corresponding coordinate of each calculated average coordinate, determining whether the dispersion of each corner of the quadrangle is less than a predetermined value, capturing a high resolution image of the rectangular object when it is determined that the dispersion of each corner of the quadrangle is less than the predetermined value, and geometrically transforming the quadrangle of the rectangular object in the high resolution image into a rectangle.

20 Claims, 6 Drawing Sheets

(51) Int. Cl.
*H04N 5/232* (2006.01)
*H04N 5/357* (2011.01)
*G06K 9/46* (2006.01)
*G06K 9/52* (2006.01)
*G06K 9/60* (2006.01)
*G06T 3/40* (2006.01)
*G06T 3/20* (2006.01)
*G06T 7/00* (2017.01)
*G06T 7/40* (2017.01)
*G06T 7/60* (2017.01)

(52) U.S. Cl.
CPC .......... *G06K 9/4661* (2013.01); *G06K 9/52* (2013.01); *G06K 9/60* (2013.01); *G06T 3/20* (2013.01); *G06T 3/403* (2013.01); *G06T 7/0085* (2013.01); *G06T 7/408* (2013.01); *G06T 7/60* (2013.01); *H04N 5/23222* (2013.01); *H04N 5/23229* (2013.01); *H04N 5/23293* (2013.01); *H04N 5/357* (2013.01)

(56) References Cited

U.S. PATENT DOCUMENTS

| | | | |
|---|---|---|---|
| 6,064,769 A | 5/2000 | Nakao et al. | |
| 7,253,926 B2 | 8/2007 | Ohkawa | |
| 7,373,173 B2 | 5/2008 | Brittan et al. | |
| 7,623,742 B2 | 11/2009 | Kim et al. | |
| 7,680,739 B1 | 3/2010 | Venturo et al. | |
| 7,778,457 B2 | 8/2010 | Nepomniachtchi et al. | |
| 7,885,451 B1 | 2/2011 | Walls et al. | |
| 7,949,176 B2 | 5/2011 | Nepomniachtchi | |
| 7,953,268 B2* | 5/2011 | Nepomniachtchi | G06K 9/36 235/379 |
| 7,978,900 B2 | 7/2011 | Nepomniachtchi et al. | |
| 8,000,514 B2* | 8/2011 | Nepomniachtchi | G06K 9/36 235/379 |
| 8,235,284 B1 | 8/2012 | Prasad et al. | |
| 8,326,015 B2* | 12/2012 | Nepomniachtchi | G06K 9/36 235/379 |
| 8,532,419 B2* | 9/2013 | Coleman | G06K 9/036 382/137 |
| 8,582,862 B2* | 11/2013 | Nepomniachtchi | G06K 9/036 138/140 |
| 8,599,766 B2 | 12/2013 | Kishiyama et al. | |
| 8,897,538 B1* | 11/2014 | Smith | G06K 9/186 382/139 |
| 9,160,946 B1 | 10/2015 | Semenov et al. | |
| 2004/0061772 A1 | 4/2004 | Yokouchi | |
| 2004/0165786 A1* | 8/2004 | Zhang | G06K 9/32 382/276 |
| 2005/0190986 A1* | 9/2005 | Sakurai | G06T 3/0006 382/275 |
| 2006/0045374 A1 | 3/2006 | Kim et al. | |
| 2006/0182331 A1 | 8/2006 | Gilson et al. | |
| 2006/0210192 A1* | 9/2006 | Orhun | G06K 9/32 382/275 |
| 2006/0222260 A1* | 10/2006 | Sambongi | G06T 5/50 382/274 |
| 2007/0292045 A1 | 12/2007 | Akatsuka | |
| 2009/0022429 A1* | 1/2009 | Longacre, Jr. | G06K 9/228 382/313 |
| 2009/0185241 A1* | 7/2009 | Nepomniachtchi | G06K 9/36 358/474 |
| 2009/0185738 A1* | 7/2009 | Nepomniachtchi | G06K 9/36 382/140 |
| 2011/0091092 A1* | 4/2011 | Nepomniachtchi | G06K 9/3275 382/139 |
| 2011/0091113 A1* | 4/2011 | Ito | G06K 9/00248 382/197 |
| 2011/0280450 A1* | 11/2011 | Nepomniachtchi | G06K 9/32 382/112 |
| 2012/0113489 A1* | 5/2012 | Heit | G06K 9/186 358/518 |
| 2012/0133779 A1* | 5/2012 | Ma | G06K 9/6249 348/175 |
| 2012/0230577 A1 | 9/2012 | Calman et al. | |
| 2012/0250942 A1 | 10/2012 | Boncyk et al. | |
| 2012/0263351 A1 | 10/2012 | Boncyk et al. | |
| 2012/0321216 A1 | 12/2012 | Kacher et al. | |
| 2013/0004076 A1* | 1/2013 | Koo | G06K 9/228 382/176 |
| 2013/0022231 A1* | 1/2013 | Nepomniachtchi | G06Q 20/042 382/102 |
| 2013/0051610 A1* | 2/2013 | Roach | G06Q 20/042 382/100 |
| 2013/0182002 A1* | 7/2013 | Macciola | H04N 1/387 345/589 |
| 2013/0182973 A1* | 7/2013 | Macciola | H04N 1/387 382/293 |
| 2013/0223673 A1* | 8/2013 | Davis | G06K 9/78 382/100 |
| 2013/0223721 A1* | 8/2013 | Nepomniachtchi | G06K 9/00536 382/138 |
| 2013/0242054 A1* | 9/2013 | Chiu | G06T 17/00 348/46 |
| 2014/0050367 A1 | 2/2014 | Chen et al. | |
| 2014/0086455 A1* | 3/2014 | Kotovich | G06K 9/036 382/112 |
| 2014/0314276 A1* | 10/2014 | Wexler | G06T 7/602 382/103 |
| 2015/0093018 A1* | 4/2015 | Macciola | G06T 3/00 382/154 |
| 2015/0317784 A1* | 11/2015 | Oshima | G06T 7/004 348/54 |
| 2015/0324390 A1* | 11/2015 | Macciola | G06K 9/00463 707/769 |

OTHER PUBLICATIONS

Nikolai Gorski, Valery Anisimov, Emmanuel Augustin, Olivier Baret, Sergey Maximov, "Industrial Bank Check 3rocessing: the 'A2iA CheckReader,'" IJDAR 3(4), 196-206 (2001).

Nikolai Gorski. Bank cheque data mining: integrated cheque recognition technologies. In: Bidyut B. Chaudhuri (ed.). Digital document processing: major directions and recent advances. Springer, 2007, pp. 437-548.

Richard R. Schultz et al., "Extraction of High-Resolution Frames from Video Sequences", Laboratory for Image and Signal Analysis Department of Electrical Engineering, University of Notre Dame, 4 pp.

L.D. Alvarez, et al. "High Resolution Images from a Sequence of Low Resolution Observations," Department of Computer Science and A.I., University of Granada, Spain; Department of Electrical and Computer Engineering, Northwestern University, Illinois, 31 pp.

Hanghang Tong, et al., "Blur Detection for Digital Images Using Wavelet Transform," Microsoft Research Asia, Beijing, China, 4 pp.

Jayant Kumar, et al., "Mobile Video Capture of Multi-page Documents," University of Maryland, College Park, Maryland; Xerox Research Center, Webster, New York, 6 pp.

Chong-Yaw Wee, et al., "Image Sharpness Measure Using Eigenvalues," Dept. of Electrical Engineering, Faculty of Engineering, University of Malaya, Kuala Lumpur, Malaysia, 4 pp.

Rhabi et al, "A Tool for Scanning Document-Images with a Photophone or a Digicam", 2012, Springer-Verlag Berlin Heidelberg, FGCN/DCA 2012, CCIS 350, pp. 331-341.

Kiran et al. "Automatic Rectification of Perspective Distortion From a Single Image Using Plane Homography", Oct. 2013, International Journal on Computational Sciences & Applications (IJCSA) vol. 3, No. 5, 47-58.

Liang et al. "Geometric Rectification of Camera-captured Document Images", May 19, 2007, IEEE Transactions on Pattern Analysis and Machine Intelligence, vol. X.

Zang et al. "Whiteboard Scanning and Image Enhancement", Jun.

(56) References Cited

OTHER PUBLICATIONS

2003, Technical Report MSR-TR-2003-39, http://www.research.microsoft.com.

* cited by examiner

SYSTEMS AND METHODS FOR CAPTURING IMAGES USING A MOBILE DEVICE

BACKGROUND

1. Technical Field

The present disclosure relates to systems and methods for automatically capturing an image. More particularly, the present disclosure relates to systems and methods for capturing a high resolution image of a rectangular object using a camera of a mobile device.

2. Background of Related Art

In recent years, built-in cameras have been incorporated into mobile devices to allow users to take pictures from any location. In addition, many mobile devices now include powerful central processing units (CPUs) for performing a wide variety of functions traditionally carried out by desktop computers. As a result, users are able to capture and process images instantly by using only their mobile devices. For example, mobile device cameras are being used to capture images of important documents and saving the captured images.

Generally, when a user wants to take a picture using a mobile device camera, the user points the camera at an object, views the object as an image in a display of the mobile device, and presses a real or virtual shutter-release button located on the mobile device to capture the image. However, capturing a right image having a desired quality has been always difficult with a mobile device.

SUMMARY

Since many mobile devices are equipped with a camera, images can be captured on the fly. A user may want to capture an image of a driver's license, a receipt, a credit card, or a check using a camera of a mobile device. The systems and methods of the present disclosure control a mobile device to capture a high quality image of an object.

In an embodiment, a method for controlling a camera of a mobile device to automatically capture images of a rectangular object includes capturing a low resolution image of the rectangular object, detecting edges of the rectangular object in the low resolution image, the edges forming a quadrangle, calculating a coordinate of each corner of the quadrangle, calculating an average coordinate of each corner of the quadrangle in a most recent predetermined number of low resolution images, calculating a dispersion of each corner of the quadrangle in the most recent predetermined number of low resolution images from a corresponding coordinate of each calculated average coordinate, determining whether the dispersion of each corner of the quadrangle is less than a predetermined value, capturing a high resolution image of the rectangular object when it is determined that the dispersion of each corner of the quadrangle is less than the predetermined value, and geometrically transforming the quadrangle of the rectangular object in the high resolution image into a rectangle.

In an aspect, the low resolution image is captured after locking onto the rectangular object using an autofocus process.

In another aspect, the coordinate is based on a pixel location within the low resolution image.

In still another aspect, the low resolution image is a video image and the high resolution image is a still image.

In still another aspect, the rectangular object is a card, document, financial note, drawing, photo, or planar object.

In still another aspect, the edges are detected based on high-brightness gradients.

In still another aspect, each corner of the quadrangle is an intersecting point of two of the detected edges.

In still another aspect, the dispersion for each corner is a mean difference, standard deviation, variance, or other statistical measure.

In an aspect, the method further includes displaying boundaries surrounding the quadrangle after detecting the edges. The boundaries surrounding the quadrangle are displayed in a color.

In another aspect, the method further includes displaying boundaries surrounding the quadrangle of the high resolution image. The boundaries surrounding the quadrangle are based on the average coordinates of each corner of the quadrangle of the most recent predetermined number of low resolution images. The method further includes calculating a coordinate of each corner of the boundaries surrounding the quadrangle by multiplying the average coordinates with a resolution ratio between a resolution of the low resolution image and a resolution of the high resolution image. In an aspect, the boundaries surrounding the quadrangle are displayed in a color.

In still another aspect, the method further includes removing a portion outside of the quadrangle of the rectangular object in the high resolution image.

In another embodiment, a mobile device includes an image capturing device configured to capture a low resolution image and a high resolution image, a display unit coupled to the image capturing device and configured to display the captured low and high resolution images, a processor coupled to the display unit; and a memory coupled to the image capturing device and the processor, and configured to store the captured low and high resolution images and instructions.

When executed by the processor, the instructions cause the processor to detect edges of a rectangular object in low resolution images of the rectangular object, the edges forming a quadrangle, calculate a coordinate of each corner of the quadrangle, calculate an average coordinate of each corner of the quadrangle in a most recent predetermined number of low resolution images, calculate a dispersion of each corner of the quadrangle in the most recent predetermined number of low resolution images from a corresponding coordinate of each calculated average coordinate, determine whether the dispersion of each corner of the quadrangle is less than a predetermined value, cause the image capturing device to automatically capture a high resolution image of the rectangular object when it is determined that the dispersion of each corner is less than the predetermined value, and geometrically transform the quadrangle of the rectangular object in the high resolution image into a rectangle.

In an aspect, the memory further includes instructions that, when executed by the processor, cause the processor to send a control signal that triggers the image capturing device to capture the high resolution image of the rectangular object.

In another aspect, the mobile device further includes a button configured to receive an input to start the image capturing device to capture a low resolution image of the rectangular object.

In still another aspect, the memory further includes instructions that, when executed by the processor, cause the processor to detect the edges of the rectangular object after the image capturing device locks an auto-focus of the rectangular object.

In still another aspect, the memory further includes instructions that, when executed by the processor, cause the processor to instruct the display unit to display boundaries of the quadrangle based on the average coordinates in a color before it is determined that the dispersion of each corner of the quadrangle is less than the predetermined value.

In still another aspect, the memory further includes instructions that, when executed by the processor, cause the processor to instruct the display unit to display boundaries of the quadrangle based on the average coordinates in a predetermined color after it is determined that the dispersion of each corner of the quadrangle is less than the predetermined value.

In still another embodiment, a method for controlling a camera of a mobile device to automatically capture images of a polygon-shaped object, the method includes capturing a low resolution image of the polygon-shaped object, detecting edges of the polygon-shaped object in the low resolution image, the edges forming an irregular polygon, calculating a coordinate of each corner of the irregular polygon, calculating an average coordinate of each corner of the irregular polygon in a most recent predetermined number of low resolution images, calculating a dispersion of each corner of the irregular polygon in the most recent predetermined number of low resolution images from a corresponding coordinate of each calculated average coordinate, determining whether the dispersion of each corner of the irregular polygon is less than a predetermined value, capturing a high resolution image of the polygon-shaped object when it is determined that the dispersion of each corner of the irregular polygon is less than the predetermined value and geometrically transforming the irregular polygon of the polygon-shaped object in the high resolution image into a regular polygon.

BRIEF DESCRIPTION OF THE DRAWINGS

Various embodiments of the present disclosure are described with reference to the accompanying drawings wherein.

DETAILED DESCRIPTION

The systems and methods of the present disclosure enable a user to use a mobile device to automatically capture a high resolution image of a rectangular object. A mobile device streams and processes video images, e.g., low resolution images, and automatically captures a high resolution image of the rectangular object based on the processed video images.

While processing, the mobile device tracks boundaries of the rectangular object in the video images and automatically captures a high resolution image of the rectangular object when it is determined that the four corners of the rectangular object in the video images are stabilized.

Figure 1A:
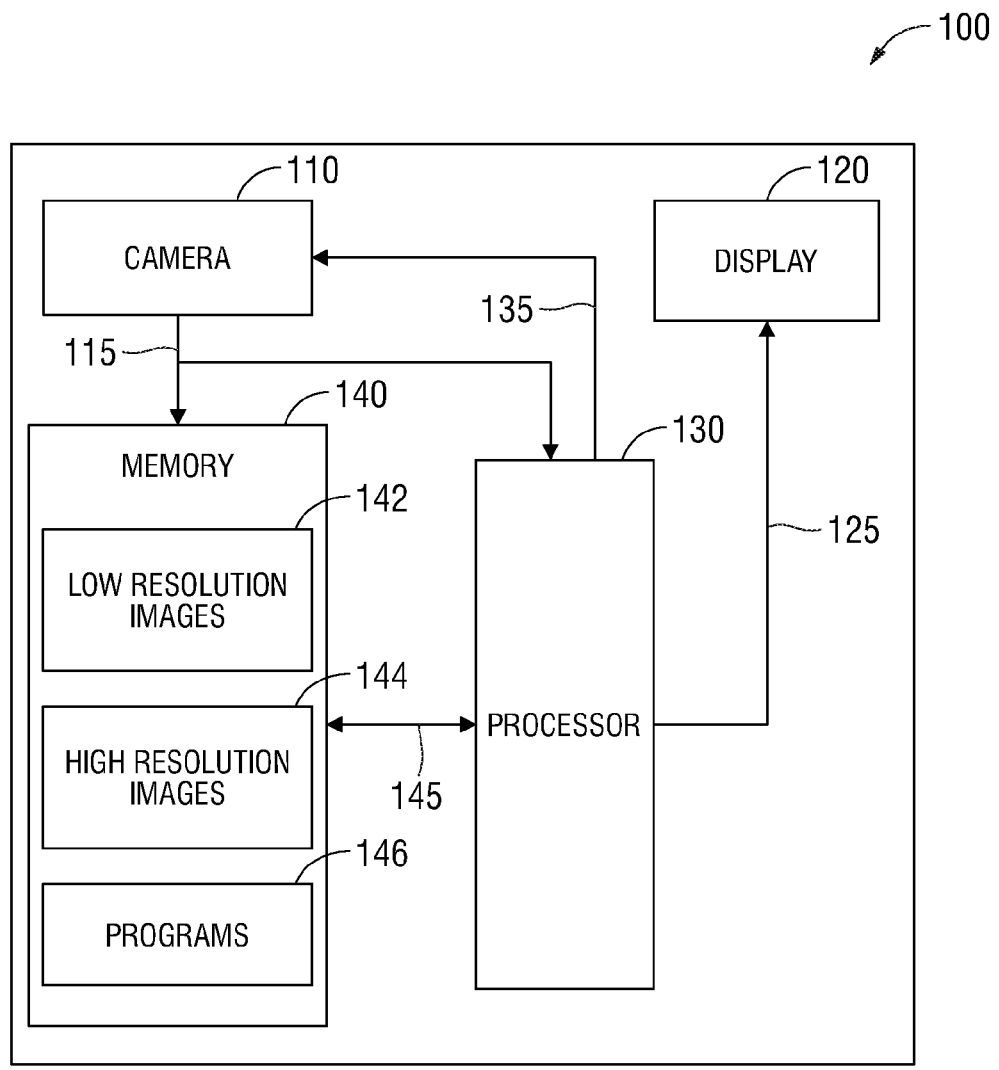
FIG. 1A is a block diagram of a mobile device, in accordance with embodiments of the present disclosure.

FIG. 1A is a block diagram of a mobile device 100 in accordance with embodiments of the present disclosure. The mobile device 100 includes a camera 110, a display 120, a processor 130, and a memory 140. The mobile device 100 may be operated by an operating system such as a version of WINDOWS® made by MICROSOFT®, IOS® and Mac OS® made by APPLE®, or ANDROID™ by GOOGLE®. An operating system of the mobile device 100 is not limited to these listed operating systems but can be operated by any other operating system, which can be readily appreciated by a person of ordinary skill in the art.

The mobile device 100 utilizes the camera 110 to capture an image of an object. The camera 110 generally includes a lens and a charge-coupled device (CCD), which are not shown in FIG. 1A. Light reflected from an object passes through the lens and hits the CCD, which in turn converts the photonic energy of the light into electrical charge. The CCD accumulates the electrical charge for a period of time and releases the charges when a signal to discharge (e.g., a shutter switch) is received. The CCD has a physical dimension, such as resolution, which dictates a number of pixels that a captured image can have. For example, the CCD may have a resolution of 4064×2704 and generate a still image having about 11.1 million pixels, and may have a resolution of 1600×1200 and generate a still image having about 2 million pixels. In an aspect, the camera 110 may include a complementary metal oxide semiconductor (CMOS) instead of the CCD. In an aspect, the mobile device 100 may be any portable handheld computing device such as a mobile phone, a smartphone, a personal digital assistant (PDA), a portable media player, a phablet, or a tablet computer.

The camera 110 may also be used to capture video images. Generally, the video images are made up of images having a lower resolution than a resolution of a still image. In particular, the video images are still images captured by the camera 110 within a short time so that, when the captured images are continuously displayed, a user can see moving images. In other words, when more than 16 still images are displayed in a second, the displayed still images are shown as moving images to human eyes.

Images captured by the camera 110 may be transferred to the display 120 via the processor 130. In particular, the captured images are transferred to the processor 130 via a data line 115. The processor 130 processes the captured image and transmits the processed image to the display 120 via a data line 125. The display 120 generally has a physical dimension, such as a screen resolution. For example, the display 120 may have a screen resolution of 1080×1920, which can display about 2 million pixels, and may have a screen resolution of 1440×2560, which can display about 3.7 million pixels. Since the resolution of the captured images and the screen resolution of the display 120 are different from each other, the captured images needs to be processed by the processor 130 in a way so that the processed image can be properly displayed within the screen of the display 120. In an aspect, the processor 130 may be a central processing unit (CPU), a graphic processing unit (GPU), or a microprocessor.

In an aspect, the processor 130 may determine which direction the mobile device 100 is positioned or held and process the captured image accordingly. In this way, the captured images are displayed correspondingly based on the determined direction (e.g., portrait or landscape).

In an aspect, the processor 130 may process images captured by the camera 110 and determine whether the captured images are in focus. If the images are out of focus, the processor 130 sends a control signal to the camera 110 via the signal line 135 to zoom in or out so that the captured images are in focus. The processor 130 may also lock the focus so that the camera 110 can capture in-focus images when there are not significant changes in the background or a main figure in the images.

In another aspect, the processor 130 may adjust brightness of images by controlling light passing through a lens shutter, which is not shown in FIG. 1A, or by adjusting the diameter of the lens shutter. The processor 130 first determines overall brightness of the captured image and adjusts the diameter of the shutter. Alternatively, the processor 130 may adjust the exposure time of the lens shutter. In other words, when the overall brightness is low, the exposure time is lengthened and, when the overall brightness is high, the exposure time is shortened so that overall brightness of a captured image is within a range suitable for intended purposes.

The memory 140 receives and saves captured images, such as low resolution images 142 and high resolution images 144. The memory 140 may include a faster memory and a slower memory. The faster memory may be used as a middle man toward the slower memory. In an aspect, the faster memory is used for storing captured images temporarily and the slower memory may be used for storing captured images permanently. The faster memory may be a random access memory (RAM), a cache, or a buffer and the slower memory may be a hard disk memory (HDD), a universal serial bus (USB) drive, or a memory card. The list of memories are not intended to be limiting but given as examples.

Since the camera 110 may capture an image at a fast pace, the slower memory may not be able to receive the captured image at the capturing speed of the camera 110. Thus, a RAM receives the captured image from the camera 110 and stores the captured image temporarily, and the slower memory receives the captured image from the RAM and stores the captured image permanently.

The memory 140 also stores programs 146, which, when executed by the processor 130, performs graphical and/or computational operations. In an embodiment, a graphic related program is stored in the memory 140. For example, a program related to locking the autofocus or to adjusting the brightness is stored in the memory 140. A pre-processing program and an active capture program may be also stored in the memory 140. The active capture program may compare the corners of an object in the captured images and determine whether the corners are stable with respect to the corners of the previously captured images of the object. When the corners are determined to be stable, the processor 130 sends an automatic capture signal to the camera 110 via a signal line 135 so that the camera 110 may automatically capture a high resolution image without a user's action, such as pressing a shutter-release button. The pre-processing program may be started when the high resolution image is captured. The high resolution image are pre-processed in the pre-processing algorithm so that corners of an object, for example, a rectangular-shaped object, in the high resolution image are detected and displayed on the display 120.

In an aspect, the memory 140 may be any suitable memory such as internal memory, external memory, or a combination of internal and external memory. The internal memory may include flash memory, a hard disk drive (HDD), and a solid state disk (SSD). The external memory may include one or more of a SIM card, an SD card, an MMC card, a CF card, a memory stick, and a thumb drive.

Figure 1B:
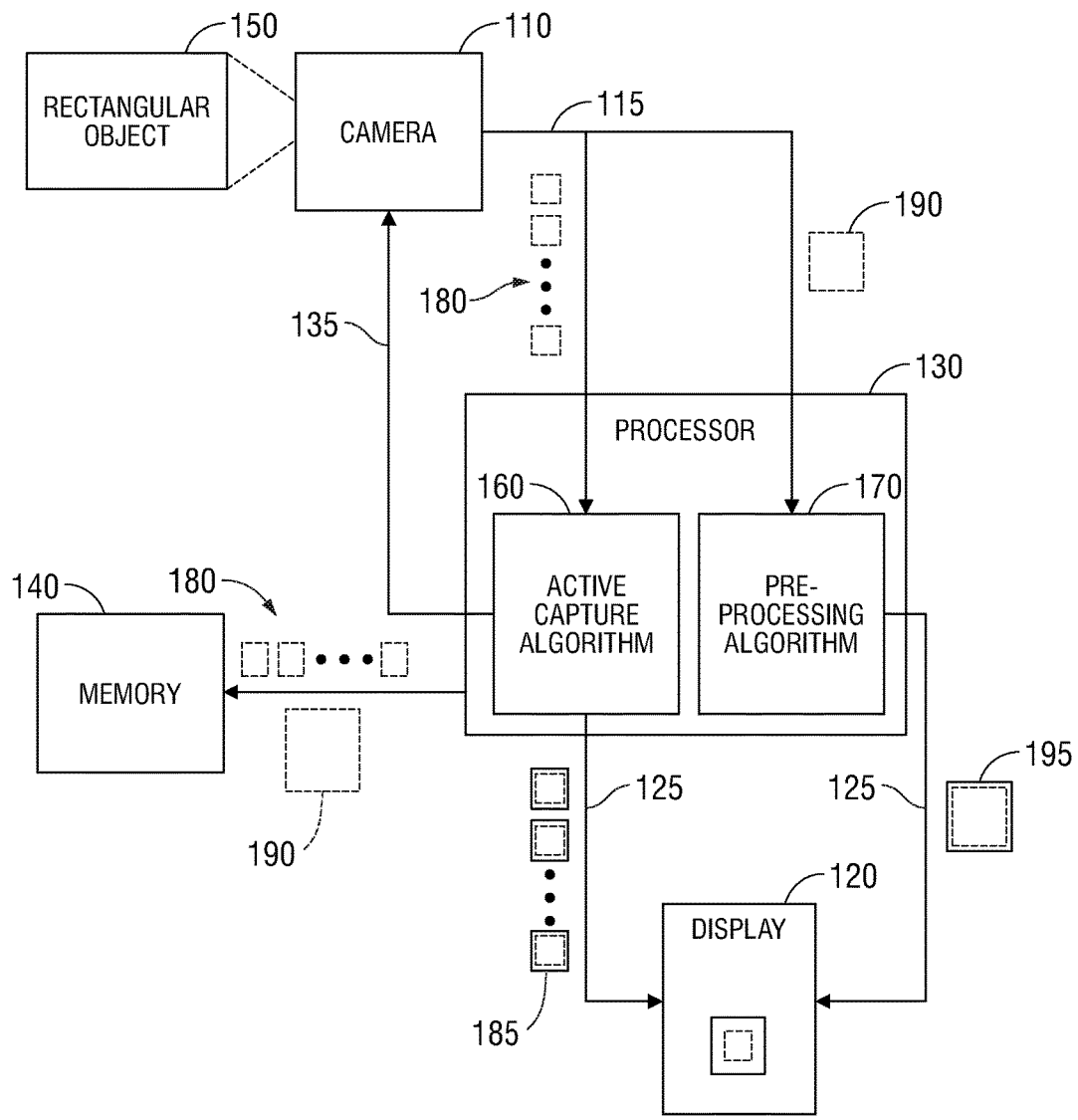
FIG. 1B is a functional block diagram of a system of the mobile device of FIG. 1A, in accordance with embodiments of the present disclosure.

FIG. 1B is a flow diagram illustrating a flow of low resolution images and a high resolution image in the mobile device 100 in accordance with embodiments of the present disclosure. When a user uses the mobile device 100 to take an image of a rectangular object 150, the camera 110 is aimed at the rectangular object 150. The camera 110 then starts to capture low resolution images 180 or a video stream of images and transmits the images or stream to the processor 130, which processes the low resolution images 180 and transmits to the display 120 so that the user can see the low resolution images 180 through the display 120. In an aspect, the processor 130 may relay the low resolution images 180 to the memory 140 for storing purpose. Alternatively, the camera 110 may directly send the low resolution images 180 to the memory 140.

In an aspect, the rectangular object 150 may be in a form of a rectangle or another polygon having intersecting edges, such as a triangle, a square, a pentagon, and the like. For the purposes of this description, the rectangular object 150 is in the form of a rectangle and can be a document, a financial card (e.g., a credit card, debit card, cash card, gift card, or store card), an identification card (e.g., a driver's license, library card, passport, visa, business card, etc.), a financial note (a cash, money order, deposit slip, check, giro, bond, stock, etc.), or a newspaper, a magazine, a price tag, etc.

When the processor 130 receives the low resolution images 180 from the camera 110, the processor 130 may execute the active capture algorithm 160, which may be started when a user of the mobile device 100 presses a camera button. The camera button may be a physical button or a virtual button displayed on the display 120. Alternatively, the active capture algorithm 160 may begin automatically when the processor 130 locks the focus of the camera 110.

When the active capture algorithm 160 is started, the low resolution images 180 are processed to detect four edges of the rectangular object 150 in the low resolution images 180. Generally, each of the low resolution images 180 includes a quadrangle image of the rectangular object 150 because the center of the camera 110 is not aligned with the center of the rectangular object 150 and/or the surface of the rectangular object 150 is not parallel with the surface of an image pickup device (e.g., CCD) of the camera 110. Thus, the four edges of the quadrangle captured in the low resolution images 180 are detected.

The step of detecting four edges may include steps of smoothing, enhancing, detecting, and localizing. The smoothing step suppresses noise without destroying the true edges of the quadrangle. The enhancing step filters the images to enhance the quality of the edges of the quadrangle. The detecting step determines which edge pixels should be discarded as noise and which edge pixels should be retained by using a threshold value as a criterion. The localizing step determines the exact location of the edges. In an aspect, thinning and linking edge pixels may be performed in the detecting step. Gradients or derivatives between pixels in images may be used to detect the edges in the active capture algorithm 160.

In an aspect, extended straight zones of high brightness gradients, which are considered as edges, are identified in the active capture algorithm 160. The gradient is a vector including a magnitude and a direction. An image has a length (e.g., x axis direction) and a width (e.g., y axis direction). Thus, the gradient is measured in two directions, which are independent from each other. For example, a gradient of a pixel may be calculated using the following equations:

$$\nabla f = \begin{pmatrix} \frac{\partial f}{\partial x} \\ \frac{\partial f}{\partial y} \end{pmatrix},$$

where $\nabla f$ is the gradient at a pixel, $$\frac{\partial f}{\partial x}$$

represents a pixel value difference in the x-axis direction, and $$\frac{\partial f}{\partial y}$$

represents a pixel value difference in the y-axis direction. The magnitude of the gradient $\nabla f$ ($mag(\nabla f)$) is calculated using the following equation:

$$mag(\nabla f) = \sqrt{\left(\frac{\partial f}{\partial x}\right)^2 + \left(\frac{\partial f}{\partial y}\right)^2} = \sqrt{M_x^2 + M_y^2},$$

where $M_x$ and $M_y$ are simplified forms of $$\frac{\partial f}{\partial x} \text{ and } \frac{\partial f}{\partial y},$$

respectively. According to this equation, the greater the magnitude of the gradient $mag(\nabla f)$, the greater the differences between a pixel and neighboring pixels. An edge can be found by searching for pixels where a magnitude of the gradient is greater than a threshold value.

The direction of gradient, $dir(\nabla f)$, is calculated using the following equation:

$$dir(\nabla f) = \tan^{-1}\left(\frac{M_y}{M_x}\right).$$

The direction of gradient is perpendicular to the direction of an edge. Thus, extended straight zones can be found by searching for consecutive pixels whose directions of gradient are substantially the same.

When the four edges of the quadrangle of the rectangular object 150 are detected, the four edges are overlaid on the quadrangle in the low resolution images 180 in the active capture algorithm 160. The overlaid images 185 are provided to the display 120 via the data line 125, and the display 120 displays the overlaid images 185 including the quadrangle and the four edges. Accordingly, a user can see the edges of the rectangular object 150 through the display 120.

In an aspect, the four edges may be displayed in red. When the four edges are stabilized, the four edges may be displayed in green. The listed colors are not intended to limit the scope of the present disclosure but to provide an example.

After the four edges of the quadrangle are detected, the four corners of the quadrangle of the rectangular object 150 are detected in the low resolution images 180. More particularly, pixels located at an intersection of two different edges are searched and detected. The four detected intersecting points of the four edges make up the four corners of the quadrangle of the rectangular object 150. For purposes of explanation, the four corners may be expressed as follows:

$$M_{ij} = (x_{ij}, y_{ij})$$

where $M_{ij}$ represents the j-th corner coordinate in the x-y coordinate system of the i-th low resolution image, and $x_{ij}$ and $y_{ij}$ are the x-axis coordinate and the y-axis coordinate of the j-th corner of the i-th low resolution image, respectively. The index value i ranges from 1 to N and the index value j ranges from 1 to 4.

The four corners of the quadrangle of the rectangular object 150 are traced and dispersion of the corners is calculated in the active capture algorithm 160. In an aspect, an average of the most recent K images are first calculated as follows:

$$V_j = \left(\frac{\sum_{i=1}^{K} x_{ij}}{K}, \frac{\sum_{i=1}^{K} y_{ij}}{K}\right) = (m_{jx}, m_{jy}),$$

where $V_j$ is the average coordinate of j-th corner of the most recent K low resolution images, and $m_{jx}$ and $m_{jy}$ are x- and y-axis coordinates of the average coordinate $V_j$ of the j-th corner, respectively. Second, deviation from the average coordinate $V_j$ of the most recent K low resolution images is calculated as follows:

$$D_j = \left(\sqrt{\frac{\sum_{i=1}^{K}(x_{ij}-m_{jx})^2}{K}}, \sqrt{\frac{\sum_{i=1}^{K}(y_{ij}-m_{jy})^2}{K}}\right),$$

where $D_j$ is a dispersion in a standard deviation of K j-th corner coordinates of the most recent K low resolution images. In an aspect, dispersion may be any statistical measure for deviation. For example, the dispersion may be a median absolute deviation or average absolute deviation.

After the dispersion is calculated, it is determined whether the dispersion for each of the four corners is less than a predetermined threshold value. When the dispersion is greater than or equal to the predetermined threshold value, the camera 110 is not sufficiently stabilized for a high resolution image 190. Then, the camera 110 continues to capture low resolution images and provides the images to the active capture algorithm 160.

When the dispersion for each corner of the quadrangle is less than the predetermined threshold value, the low resolution images 180 are stabilized. In other words, in such case, the camera 110 is moving or shaking minimally so that the camera 110 is ready to take a high resolution image having a high quality. A control signal is then generated and sent to the camera 110 via a signal line 135 to cause the camera 110 to automatically capture a high resolution image 190 without a user's further action. Since no movement or action of pushing a button is necessary and the camera 110 is sufficiently stabilized, the high resolution image 190 can be automatically captured and have high quality.

The captured high resolution image 190 is provided to the pre-processing algorithm 170, in which the four corners of a quadrangle of the rectangular object 150 are searched for in the high resolution image 190. The pre-processing algorithm 170 does not start from analyzing the whole area of the high resolution image 190, but rather uses the results of the active capture algorithm 160. First, a scale S between the low resolution images 180 and the high resolution image 190 is calculated. In a case where the length-width ratio of the low resolution images 180 is the same as the length-width ratio of the high resolution image 190, the scale S is the ratio between the length-width ratios of the low resolution images 180 and the high resolution image 190. Otherwise, two scales (e.g., x-axis scale $S_x$ and y-axis scale $S_y$) are calculated. The former case is described first and the latter case next.

The pre-processing algorithm 170 uses the results of the active capture algorithm 160, which are the detected four edges of the rectangular object 150 in the low resolution images 180. Since the rectangular object 150 in the high resolution image 190 may be located at a location proportionally similar to the location of the rectangular object 150 in the most recent low resolution image or the average coordinate of the most recent K low resolution images, the four corners of the rectangular object are estimated in the high resolution image 190 according to the pre-processing algorithm 170 by simply multiplying the scale S to the four corners of the most recent low resolution image or of the average coordinates. An area sufficiently large to surround a quadrangle of the rectangular object 150 in the high resolution image 190 is set based on the estimated four corners. The set area may include the inside area of the quadrangle made up of the multiplied four corners. In an aspect, the determined area may be a combined area of four line zones, the widths of which are sufficiently large to cover the actual four edges of the rectangular object 150 in the high resolution image 190.

As described above, extended straight zones of high brightness gradients are also searched for in the set area in the pre-processing algorithm 170. Because the set area is much smaller than the entire area of the high resolution image 190, the edge detection process as described above may be highly efficient.

After the four edges are identified, the four corners of the quadrangle of the rectangular object 150 are calculated in the high resolution image 190, which are the four intersecting points of the four edges, in the pre-processing algorithm 170.

In the meantime, the detected four edges may be overlaid on the high resolution image 190 and the overlaid image 195 may be provided to the display 120. In this way, a user can see the high resolution image 190 with the detected edges.

The quadrangle made up of the estimated four corners is transformed into a rectangle in the pre-processing algorithm 170. This geometrical transformation may be performed by multiplying an affine transformation matrix or projective transformation matrix, which can perform translation, scaling, homothety, similarity transformation, reflection, rotation, shear mapping, and compositions of them. A remainder of the image lying outside of the rectangle is then removed. The processor 130 scales and provides the rectangle to the display 120 so that the rectangle is displayed in the whole area of the display 120.

In a case in which the length-width ratio of the high resolution image 190 is different from the length-width ratio of the low resolution images 180, the x-axis scale $S_x$ and the y-axis scale $S_y$ may be multiplied with the x-axis coordinate and the y-axis coordinate of the average coordinate $V_j$, respectively. Thus, the coordinate of the estimated j-th corner may be ($S_x \cdot m_{jx}$, $S_y \cdot m_{jy}$). The estimated four corners are obtained as described above with the single scale S.

In an aspect, the camera 110 may have parameters for a high resolution image and a low resolution image. For example, a low resolution image may have 640×480 or 4:3 length-width ratio, while a high resolution image may have 1920×1080 or 16:9 length-width ratio. Because of the different length-width ratios, the high resolution image may show a larger area than the low resolution image, even when the position of the camera 110 is fixed and the camera 110 is taking both high and low resolution images of the same rectangular object 150. The parameters may be a parameter for translation, a ratio parameter for the length, and a ratio parameter for the width. With these parameters, the four corners of the quadrangle may be estimated in the high resolution image 190 from the four corners of the quadrangle in the low resolution image. This may be applied when the low and high resolution images have the same length-width ratio but show different areas.

FIGS. 2A-2D illustrate a mobile device 200 that captures low and high resolution images of a rectangular object. The mobile device 200 may be a digital camera, a tablet personal computer (PC), a personal digital assistant (PDA), a smart phone, a hand-held device which has a camera that can take pictures, or a web camera. The mobile device 200 includes a camera 210 and a display 220. The camera 210 may be disposed on the back side and/or on the front side of the mobile device 200. The mobile device 200 may also include a physical button that causes the camera 210 to capture an image of an object. Alternatively or additionally, if the display 220 is a touch screen monitor, the button may be a selectable icon or button in a graphical user interface that may be displayed on the display 220.

The mobile device 200 stores captured images of an object in the memory of the mobile device 200 as an image data file in one of the standard formats including, but not limited to, .jpg, .tiff, .bmp, and .gif. The list of image data files is not intended limiting but listed as examples. The data file can contain a color (R+G+B color planes, 8 bits or more per pixel), grayscale (8 bits per pixel), or binarized (1 bit per pixel) image of the object.

The display 220 displays a captured image of a rectangular object, such as a financial card (a credit card, debit card, cash card, gift card, or store card), an identification card (e.g., a driver's license, library card, passport, visa, business card, etc.), a financial note (a cash, money order, deposit slip, check, giro, bond, stock, etc.), or a newspaper, a magazine, a price tag, etc. The display 220 can also display an image data stream, including low resolution images, of the rectangular object received from the camera 210 before the camera 210 captures a high resolution image. The display 220 may be a touch screen monitor.

Figure 2A:
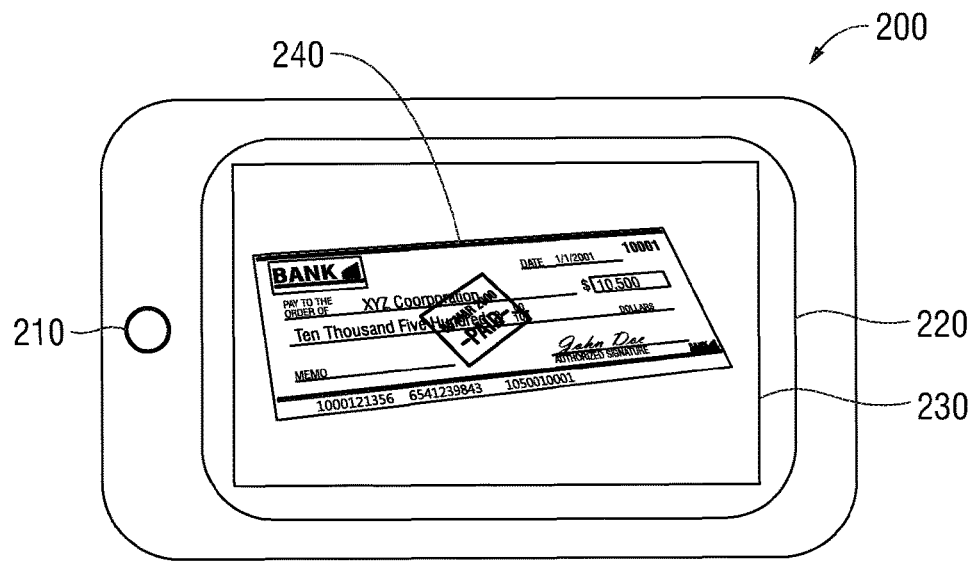
FIG. 2A is a schematic diagram of a mobile device capturing an image of a rectangular object, in accordance with embodiments of the present disclosure.

FIG. 2A illustrates a low resolution image 230 of a rectangular object 240 (e.g., a personal check) being displayed in the display 220 of the mobile device 200. The low resolution image 230 distorts the shape of the rectangular object 240, which is shown as a quadrangle rather than a rectangle. This occurs because the plane of the image sensor in the camera of the mobile device may not be parallel to the plane of the personal check that is being photographed or the center of the camera may not be aligned with the center of the personal check along the longitudinal axis of the optical focus.

Another distortion appearing in the low resolution image 230 may be non-uniform lighting on the rectangular object 240. As shown in FIG. 2A, a right portion of the rectangular object 240 is brighter than other portions of the rectangular object 240. The quadrangle may also include a shadow portion created by the angle of the light that illuminates the rectangular object 240. In an aspect, the processor of the mobile device 200 may filter the captured image using a lighting compensation algorithm to make the lighting of the rectangular object 240 uniform.

In general, the spatial frequencies of the non-uniform lighting (the "noise" part) are essentially lower than the spatial frequencies of the rectangular object itself. Thus, low-frequency noise may be removed from a captured image by computing a local average and then subtracting the local average from the captured image. However, because the captured image is the product of the signal part and the noise part (i.e., captured image=signal part×noise part), low-frequency noise may be removed in the logarithmic space (and not in the initial space). This may be accomplished by filtering the captured image according to the lighting compensation algorithm, which may take the logarithm of the captured image, remove low-frequency noise by subtracting the local average from the logarithm of the captured image, and convert the logarithm of the captured image back into the non-logarithmic space by taking the exponent of the logarithm of the captured image. This lighting compensation algorithm may be described by the following formula:

$$I_1 = e^{\log(I(x,y)) - Avg(\log(x,y))},$$

where I(x,y) is the captured image at point (x, y), $I_1$ is the filtered image at point (x,y), and Avg( ) is a local averaging function, which performs the convolution of the captured image with a bell-like kernel. After the captured image is filtered, it may have uniform lighting.

Figure 2B:
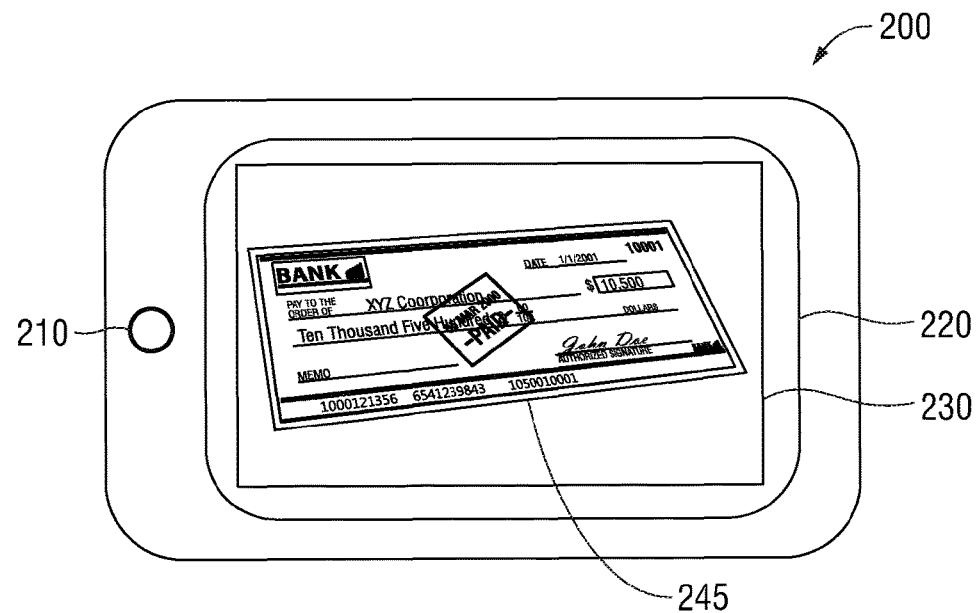
FIG. 2B is a schematic diagram of a mobile device displaying boundaries of the rectangular object of FIG. 2A, in accordance with embodiments of the present disclosure.

The active capture algorithm executed by the processor of the mobile device 200 may detect four edges 245 of the quadrangle in the low resolution images and the display 220 may display the low resolution image with the detected four edges 245 as shown in FIG. 2B. The four edges 245 may be displayed in red or in any color that indicates that the four edges are moving more than a threshold value compared to four edges of neighboring low resolution images.

In an aspect, the four corners of the quadrangle may be detected rather than the movement of the four edges. The four corners of the quadrangle may be detected by finding four intersecting points of the four edges, and an average coordinate of each corner may be calculated from the most recent K low resolution images. The average coordinate is used to calculate dispersion of the most K low resolution images from the average coordinate. If the dispersion is greater than or equal to a threshold value, the four edges are highlighted in red, or any other color, to indicate that the camera is not stabilized.

If the dispersion is less than the threshold value, the camera is determined to be stabilized. In this case, the four edges are displayed in green or any color suitable to indicate that the camera is stabilized. As soon as the camera is determined to be stabilized, the camera automatically captures a high resolution image of the rectangular object without any action by a user.

Figure 2C:
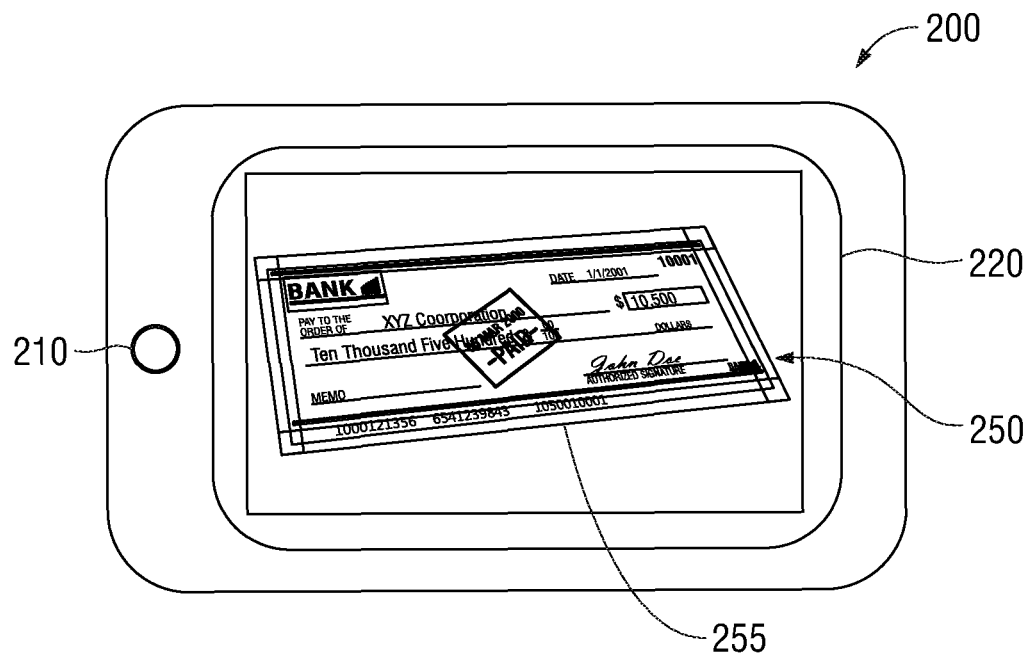
FIG. 2C is a schematic diagram of a mobile device displaying a high resolution image of the rectangular object of FIG. 2A, in accordance with embodiments of the present disclosure.

FIG. 2C shows a high resolution image 250 captured by the camera. Even though the resolution of the high resolution image 250 is different from the resolution of the low resolution image 230, the location of the rectangular object in the high resolution image 250 is proportionally similar to the location of the rectangular object in the low resolution image 230. Thus, the four edges of the quadrangle of the rectangular object in the high resolution image 250 may be obtained from the four edges of the quadrangle in the low resolution image 230. An estimation of the four edges 255 is indicated by four elongated rectangles having dimensions that cover the actual four edges of the quadrangle in the high resolution image 250. Since the estimated edges 255 are small compared to the high resolution image 250, the edge detection process can be completed in a short amount of time.

Figure 2D:
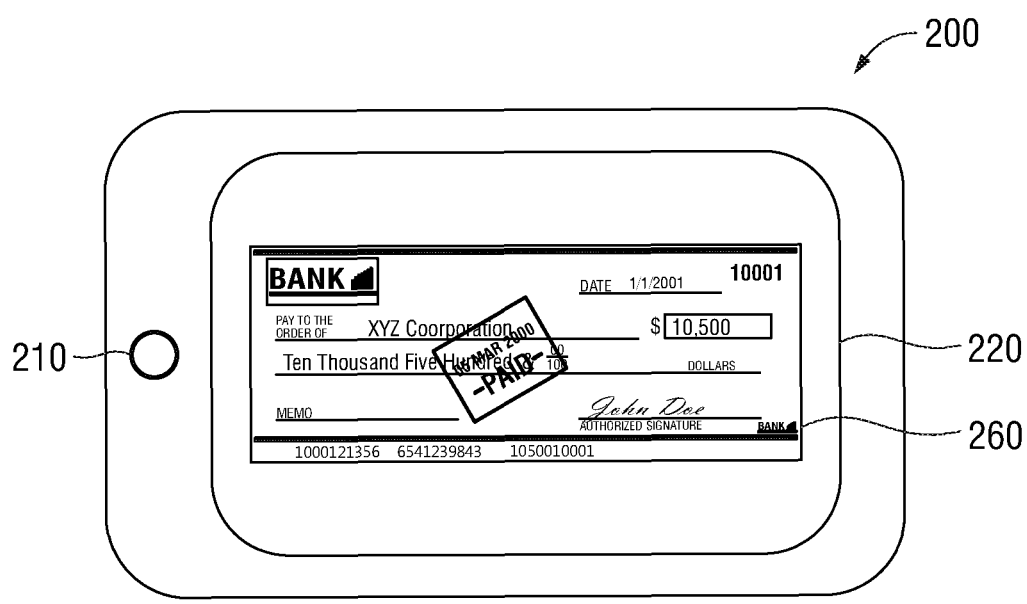
FIG. 2D is a schematic diagram of a mobile device displaying a transformed high resolution image of the rectangular object of FIG. 2A, in accordance with embodiments of the present disclosure.

The four corners are calculated from the estimated four edges 255. Based on the four corners or the four edges, an area outside of the quadrangle is removed. Then, the four corners are used to transform the quadrangle into a rectangle. As a result, a high quality image of the rectangular object having a rectangle shape is obtained. FIG. 2D shows the transformed rectangle 260 of the rectangular object.

In embodiments, the transforming process may employ an affine transformation, which may be a translation, a geometric contraction, an expansion, a dilation, a reflection, a rotation, a shear, a similarity transformation, a spiral similarity, or any combination thereof, to convert an irregularly-shaped image of a rectangular object to a rectangle. Other transformations may be employed based on the status of the quadrangle in a captured image.

Figure 3A:
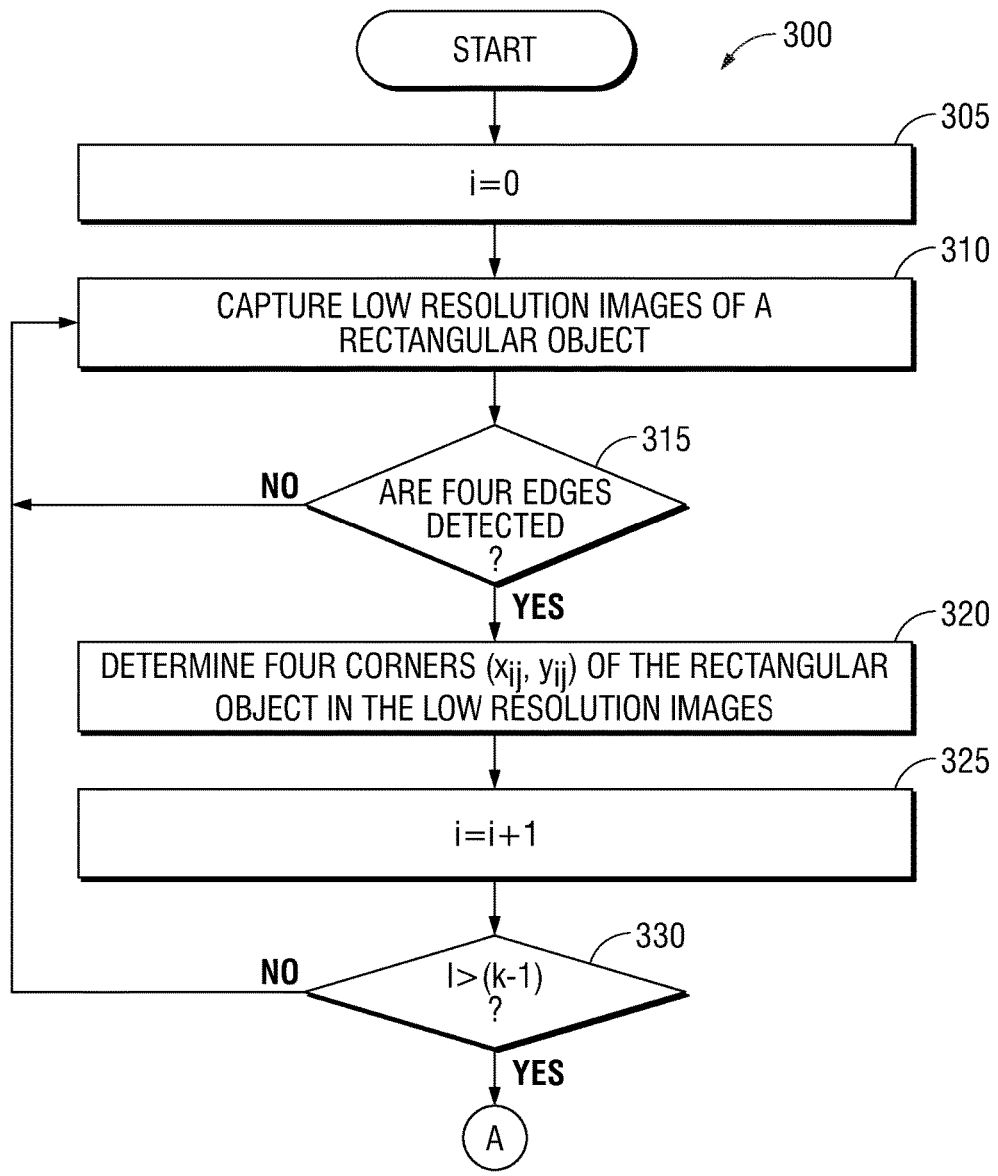
FIGS. 3A and 3B are flowcharts illustrating a method of automatically capturing a high resolution image of the rectangular object, in accordance with embodiments of the present disclosure.
Figure 3B:
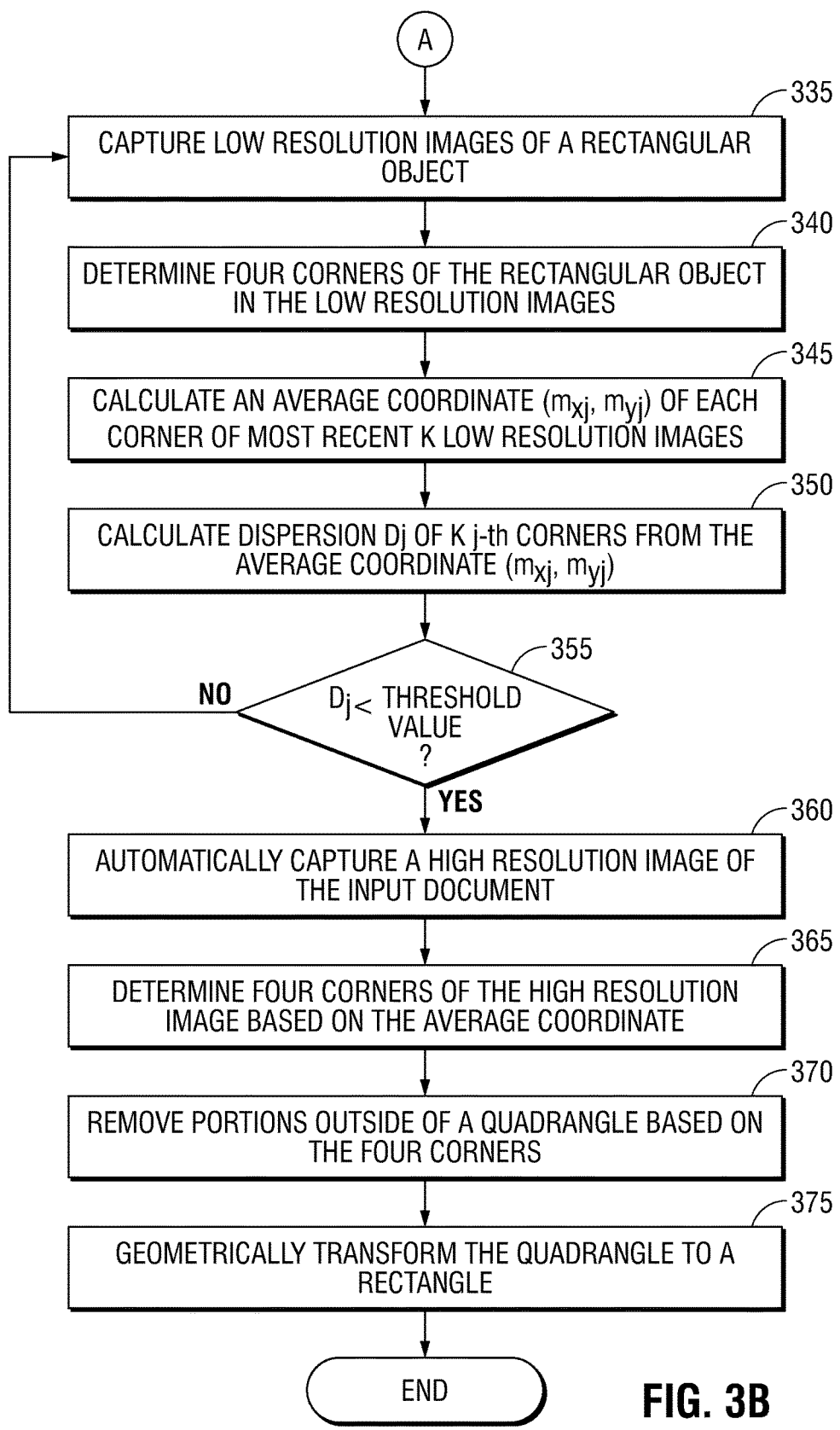

FIGS. 3A and 3B are flowcharts of a method 300 of automatically capturing a high quality, high resolution image of a rectangular object. In an aspect, the method 300 begins when a user aims a camera of a mobile device toward a rectangular object to be photographed. Alternatively, the method 300 begins when an autofocus process performed by the camera locks onto the rectangular object so that high quality captured images may be obtained. In step 305, a counter having count i is initialized to zero and, in step 310, the camera starts streaming a low resolution image of a rectangular object. Due to misalignment between the camera and the rectangular object, the rectangular object may be shown as a quadrangle rather than a rectangle in the low resolution image.

In step 315, it is determined whether four edges forming a quadrangle are detected in the low resolution image. When it is determined that no quadrangle is detected, step 310 is repeated until all edges forming a quadrangle are detected. When it is determined that all edges forming the quadrangle are detected, the four corners of the quadrangle are calculated in step 320. The four edges of the quadrangle may be detected by using an edge detection program (e.g., the active capture algorithm 160 of FIG. 1A) to look for straight lines in the low resolution image. In another embodiment, the edge detection program searches for extended straight high brightness zones in the low resolution image.

The four corners ($x_{ij}$, $y_{ij}$) of the quadrangle are then determined based on the four edges, where $x_{ij}$ and $y_{ij}$ represent x-axis and y-axis coordinates, respectively, of the j-th corner of the i-th low resolution image, where j ranges from one to four. Since a straight edge includes a plurality of pixels, the four corners can be found by identifying the pixels included in two different edges. Each detected edge may be expressed as a linear equation, such as y=ax+b. By solving a system of two linear equations, an intersecting point can be calculated.

After four corners are determined, the counter value i is incremented by one, in step 325. In step 330, the counter value i is compared with a predetermined number k−1 (k minus one). If the counter value i is less than the predetermined number k−1, the camera continues to capture other low resolution images of the rectangular object. When it is determined that the counter value i is greater than or equal to the predetermined number k−1, the method 300 advances to step 335 in FIG. 3B. Step 330 is performed to ensure that the camera of the mobile device captures at least the predetermined number k−1 of low resolution images, each of which includes a quadrangle image of the rectangular object.

Steps 335 and 340 are performed in a similar manner to steps 310 and 320 of FIG. 3A, except that another low resolution image is added to yield at least k low resolution images. In step 345, an average coordinate ($m_{xj}$, $m_{yj}$) of each of the four corners of the most recent k low resolution images is calculated, where $m_{xj}$ and $m_{yj}$ are x-axis and y-axis coordinates of the average coordinate, respectively, of the j-th corner of the quadrangle. In an aspect, the average coordinate may be obtained by using an arithmetic mean, a mode, or a median.

In step 350, a dispersion $D_j$ of the j-th corners of the most recent k low resolution images from the average coordinate ($m_{xj}$, $m_{yj}$) is calculated. In aspects, the dispersion $D_j$ may be any statistical measure for deviation. For example, the dispersion $D_j$ may be a median absolute deviation or average absolute deviation.

After the dispersions of four corners are calculated, each dispersion $D_j$ is compared with a threshold value at step 355. Step 355 ensures that the camera captures images of good quality. If it is determined that at least one of the dispersions is greater than or equal to the threshold value, steps 335-350 are repeated. In this case, indices of the low resolution images are assumed to be renumbered so that newly formed most recent k low resolution images have the index value i ranging from 1 to k.

When it is determined that each dispersion $D_j$ of the four corners is less than the threshold value, step 360 is performed. The camera receives a control signal from the processor of the mobile device so that the camera automatically captures a high resolution image of the rectangular object without receiving an input from a pressed button. In this way, the high resolution image can be of good quality.

In step 365, the four corners of the quadrangle displayed in the high resolution image are determined based on the average coordinate ($m_{xj}$, $m_{yj}$) of the most recent k low resolution image. Due to the different resolutions of the high and low resolution images, the average coordinate ($m_{xj}$, $m_{yj}$) may be scaled to estimate the four edges of the quadrangle in the high resolution image. The edge detection program is applied to estimate four edges, which have a relatively small area compared to the whole area of the high resolution image. The estimated four edges are sufficiently large to cover the actual four edges of the quadrangle.

After the detection of the four edges, four corners are determined by identifying pixels that are included in two edges. In step 370, portions of the image that lie outside of the quadrangle made up of the four corners are removed and in step 375, the quadrangle is transformed into a rectangle. In an aspect, the steps 370 and 375 may be interchangeable. The rectangle is displayed in full scale within the display of the mobile device. In this way, a high resolution image including a rectangular image of a rectangular object is obtained without the distortions that may correspond to a user's action of pushing a button.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:

1. A method for controlling a camera of a mobile device to automatically capture images of a rectangular object, the method comprising:
    capturing a video stream including low resolution images of the rectangular object;
    calculating a coordinate of each corner of a quadrangle in each frame of the video stream;
    calculating a statistical measure for deviation of the coordinate of each corner of the quadrangle in each frame of the video stream;
    capturing a high resolution image of the rectangular object based on the statistical measure; and
    geometrically transforming a quadrangle of the rectangular object in the high resolution image into a rectangle.

2. The method according to claim 1, wherein the video stream is captured after locking onto the rectangular object using an autofocus process.

3. The method according to claim 1, wherein the coordinate is based on a pixel location within the video stream.

4. The method according to claim 1, wherein the high resolution image is a still image.

5. The method according to claim 1, wherein the rectangular object is a card, document, financial note, drawing, photo, or planar object.

6. The method according to claim 1, wherein edges of the quadrangle in each frame of the video stream are detected based on high-brightness gradients.

7. The method according to claim 1, wherein the statistical measure is a mean difference, standard deviation, or variance.

8. The method according to claim 1, further comprising displaying boundaries surrounding the quadrangle in each frame of the video stream.

9. The method according to claim 8, wherein the boundaries surrounding the quadrangle in each frame of the video stream are displayed in a color.

10. The method according to claim 1, further comprising displaying boundaries surrounding the quadrangle of the rectangular object in the high resolution image.

11. The method according to claim 10, wherein the boundaries surrounding the quadrangle of the rectangular object in the high resolution image are based on the statistical measure of the coordinate of each corner of the quadrangle in each frame of the video stream.

12. The method according to claim 10, wherein the boundaries surrounding the quadrangle of the rectangular object in the high resolution image are displayed in a color.

13. The method according to claim 1, further comprising removing a portion outside of the quadrangle of the rectangular object in the high resolution image.

14. A mobile device comprising:
    an image capturing device configured to capture a video stream including low resolution images, and capture a high resolution image;

a display unit coupled to the image capturing device and configured to display the captured video stream and high resolution image;
a processor coupled to the display unit; and
a memory coupled to the image capturing device and the processor, the memory configured to store the captured low and high resolution images and instructions, that, when executed by the processor, cause the processor to:
   cause the image capturing device to capture the video stream including the low resolution images of a rectangular object;
   calculate a coordinate of each corner of a quadrangle of the rectangular object in each frame of the video stream;
   calculate a statistical measure for deviation of the coordinate of each corner of the quadrangle in each frame of the video stream;
   cause the image capturing device to automatically capture a high resolution image of the rectangular object based on the statistical measure; and
   geometrically transform a quadrangle of the rectangular object in the high resolution image into a rectangle.

15. The mobile device according to claim 14, wherein the memory further includes instructions that, when executed by the processor, cause the processor to send a control signal that triggers the image capturing device to capture the high resolution image of the rectangular object.

16. The mobile device according to claim 14, further comprising a button configured to receive an input to start the image capturing device to capture the video stream of the rectangular object.

17. The mobile device according to claim 14, wherein the memory further includes instructions that, when executed by the processor, cause the processor to capture the video stream after the image capturing device locks an auto-focus of the rectangular object.

18. The mobile device according to claim 14, wherein the memory further includes instructions that, when executed by the processor, cause the processor to instruct the display unit to display boundaries of the quadrangle of the rectangular object in the high resolution image based on the statistical measure.

19. The mobile device according to claim 14, wherein the memory further includes instructions that, when executed by the processor, cause the processor to instruct the display unit to display boundaries of the quadrangle in each frame of the video stream.

20. A method for controlling a camera of a mobile device to automatically capture images of a polygon-shaped object, the method comprising:
   capturing a video stream including low resolution images of the polygon-shaped object;
   calculating a coordinate of each corner of an irregular polygon in each frame of the video stream;
   calculating a statistical measure for deviation of the coordinate of each corner of the irregular polygon of the polygon-shaped object in each frame of the video stream;
   capturing a high resolution image of the polygon-shaped object based on the statistical measure; and
   geometrically transforming the irregular polygon of the polygon-shaped object in the high resolution image into a regular polygon.

* * * * *